United States Patent [19]

Takashi

[11] Patent Number: 5,508,671
[45] Date of Patent: Apr. 16, 1996

[54] ELECTROMAGNETIC COUPLING DEVICE

[75] Inventor: Ishimaru Takashi, Kiryu, Japan

[73] Assignee: Ogura Clutch Co., Ltd., Japan

[21] Appl. No.: 517,746

[22] Filed: Aug. 22, 1995

[30] Foreign Application Priority Data

Aug. 9, 1994 [JP] Japan ............................. 6-24035

[51] Int. Cl.$^6$ ........................... F16D 27/14; H01F 27/04; H01F 15/10
[52] U.S. Cl. ........................ 335/296; 336/107; 336/192; 335/299
[58] Field of Search ................................. 335/296–299; 336/107, 192; 192/84 C

[56] References Cited

U.S. PATENT DOCUMENTS

| | | | |
|---|---|---|---|
| 4,119,184 | 10/1978 | Mower et al. | 192/82 T |
| 4,935,713 | 6/1990 | Bekheet | 335/296 |
| 5,138,293 | 8/1992 | Ishimaru | 335/289 |

FOREIGN PATENT DOCUMENTS 48020   6/1994   Japan .

Primary Examiner—Leo P. Picard
Assistant Examiner—Raymond M. Barrera
Attorney, Agent, or Firm—Reising, Ethington, Barnard & Perry

[57] ABSTRACT

The electromagnetic clutch 1 includes a driven shaft 3, an armature assembly 4, a rotor and a coil assembly. The armature assembly 4 is mounted on the driven shaft 3. The rotor 7 is driven by a belt that engages the poly V-groove 7d. The coil assembly is supported in a groove 7a in the rotor. When the coil assembly is energized the armature 17 of the armature assembly 4 is pulled axially into contact with the rotor 7 and torque is transmitted from the rotor to the driven shaft 3. The coil assembly includes a magnetizing coil 21 enclosed in a bobbin 19 and a cover 20 and secured in a yoke 18. The bobbin 19 includes a terminal holder 19j. A terminal holder 19j receives a terminal assembly 23 and is held in position by a terminal housing 28. The terminal assembly 23 includes two terminals 24 connected by a diode 25. The diode 25 and a portion of each terminal is embedded in an enclosing member 27.

2 Claims, 14 Drawing Sheets

ELECTROMAGNETIC COUPLING DEVICE

TECHNICAL FIELD

The invention is in an electromagnetic coupling device such as an electromagnetic clutch and more particularly in an electromagnetic coil assembly that has a voltage surge absorption element connected in parallel with a magnetizing coil to a pair of terminals.

BACKGROUND OF THE INVENTION

Conventional electromagnetic coupling devices, particularly electromagnetic clutches mounted on vehicle air conditioner compressors have a magnetizing coil with multiple wound turns. The magnetizing coil is covered with an insulating resin and fit into an annular groove in a yoke. The starting end of the wound section and the final end of the wound section of the magnetizing coil are drawn outside through through-holes in a pair of rubber bushings press-fit into passages through the bottom of the yoke. Each end of the magnetizing coil, which is drawn out, is connected to a pair of terminals in a terminal block that is affixed to the back of the yoke. A diode is connected to the terminals and is in parallel to the magnetizing coil as shown in Japanese Kokoku Patent No. Hei 6[1994]-48020. The terminals are formed from thin sheet metal material by stamping and bending. A pair of slits are formed in a first connection section of each terminal for receiving a lead from the magnetic coil. A second connection section of each terminal has slits for receiving a lead from the diode. A third connecting section of each terminal is connectable to a power source. The two terminals are placed in an injection molding machine and partially encased in a resin terminal block. The terminal block is then secured to the yoke.

After the terminal block is affixed to and held by the yoke, each end of the magnetizing coil is drawn outside through a through-hole in a rubber bushing from the annular groove in the yoke. The coil leads are each connected to the first connection section of one of the terminal in the terminal block. The diode leads are connected to the second connection section of each terminal. A cover made of resin material is pressed and fitted to the edge of the opening of the terminal block, with an elastic packing material held between them, and the inside of the terminal block is insulated by being closed off from the outside.

U.S. Pat. No. 4,935,713 issued to Bekheet discloses an electromagnet in an electromagnetic clutch having a yoke in which an annular groove is formed. A coil bobbin is integrally formed with a square columnar terminal holder section as a terminal block that passes externally through a nearly rectangular through-hole through the bottom of the aforementioned yoke. A magnetizing coil is positioned inside the coil bobbin inside the yoke. A coil cover that covers the end of the magnetizing coil, which is exposed beyond the coil bobbin's surrounding section is pressed into the yoke's annular groove and is secured in place. A terminal housing fits into the terminal holder section of the coil bobbin in which a pair of terminals are mounted.

The electromagnet of a conventional electromagnetic coupling device has the starting end of the wound section and the final end of the wound section of a magnetizing coil, which is previously wound in multiple turns, inserted into a pair of insertion holes through the terminal holder section of the coil bobbin, while at the same time nearly half of the magnetizing coil fits into an annular groove in the coil bobbin. The approximately half of the magnetizing coil that is exposed beyond the annular groove of the coil bobbin is covered by a coil cover. The coil assembly made up of this coil bobbin, magnetizing coil, and coil cover is pressed into the yoke's annular groove while the terminal support section of the coil bobbin is drawn outside through a through-hole in the yoke. After the coil assembly is pressed in, part of the edge of the opening in the yoke plastically flows toward the annular groove and the coil assembly is secured inside the yoke's annular groove. A first connection section for each terminal, in which a slit is formed, is pressed into each open section of the terminal support section. A lead from the magnetizing coil is forced into the slit in the first connection section as each terminal is pressed into an open section. A terminal housing is slid down over the two terminals and the terminal support section of the coil bobbin. A pair of cut pieces on an attaching plate fused to the back of the yoke are bent, by press working, into depression sections formed in a pair of flanges on the terminal housing so that the coil bobbin terminal holder section is secured to and held by the yoke while covered by the terminal housing. Thus, the electromagnet of this electromagnetic coupling device can be connected to the terminal's first connection section without externally exposing the starting end of the wound section and the final end of the wound section of the magnetizing coil, which is pressed into the yoke's annular groove.

The electromagnet in the conventional electromagnetic coupling device disclosed in Japanese Kokoku Patent No. Hei 6[1994]-48020 uses a structure in which a pair of terminals is injection-molded in a terminal block made of resin material in advance so that the terminals will be separated and parallel. The starting end of the wound section, the final end of the wound section of the magnetizing coil, and each of the diode lead wires will be connected to the first and second connection sections of the terminals. A process in which each end section of the magnetizing coil is connected to a terminal's first connection section, a process in which each lead wire of the diode is connected to a terminal's second connection section, and further, a process in which a cover is press-fit into the terminal block, with an elastic material packing between them, and secured is required. These assembly processes are tedious, time consuming and difficult. They are completed manually. The leads from the magnetizing coil and from the diodes are relatively long and unsupported. As a result of their unsupported length the leads may break when exposed to vibration. Magnetic clutches for air conditioner compressors are subjected to the vibrations from the engine to which the compressor is attached. Over time the vibrations can cause lead breakage and clutch failures.

SUMMARY OF THE INVENTION

An object of the invention is to construct a terminal and magnetizing coil assembly that resists damage when subjected to vibrations.

Another object of the invention is to provide a terminal and magnetizing coil assembly that can be assembled quickly and accurately.

A further object of the invention is to provide an electromagnetic clutch with improved reliability and extended life.

The electromagnetic clutch includes a rotor, an armature assembly and a magnetizing coil and terminal assembly. The magnetizing coil and terminal assembly has a magnetizing coil with a number of wraps and two leads. One end of the magnetizing coil is inserted into a bobbin with an integral terminal holder section. The two coil leads extend through the terminal holder section. The other end of the magnetizing coil is received in a cover. The bobbin, magnetizing coil and cover are positioned in an annular groove in a yoke with the terminal holder section extending through a through-hole in the base of the annular groove. The bobbin and cover are pressed into the yoke to hold the magnetizing coil axially and radially and staked in position. The portion of the terminal holder section that extends outside the yoke has two coil lead wire support posts encircled by terminal guide grooves.

The terminal assembly has two terminals, a diode and an enclosing member 27. The terminals have first, second and third connection sections. The first connection section of each terminal has a coil lead slot and receives a lead wire support when forced into a terminal guide groove in a terminal holder. The leads of a diode are soldered to the second connection sections of two terminals. The diode is a voltage surge absorption element that protects the magnetizing coil. The third connection sections are for connecting the terminals to a power source.

The terminals and a diode bridge are placed in an injection molding machine and the second connection sections of the terminals and the connected diode are encased in a resin enclosing member.

The first connection sections of two terminals that are secured together by an enclosing member are forced into the terminal guide grooves in the terminal holder section of the coil bobbin. The terminals cooperate with the lead wire support posts and forces the coil leads into the coil lead slots in the first connection sections.

A terminal housing telescopically receives the terminals, the enclosing member and the coil bobbin terminal holder section. After the terminal housing is properly positioned upon the terminal holder, it is secured to the yoke.

The foregoing and other objects, features and advantages of the present invention will become apparent in the light of the following detailed description of exemplary embodiments thereof, as illustrated in the accompanying drawing.

BEST MODE FOR CARRYING OUT THE INVENTION

Figure 1:
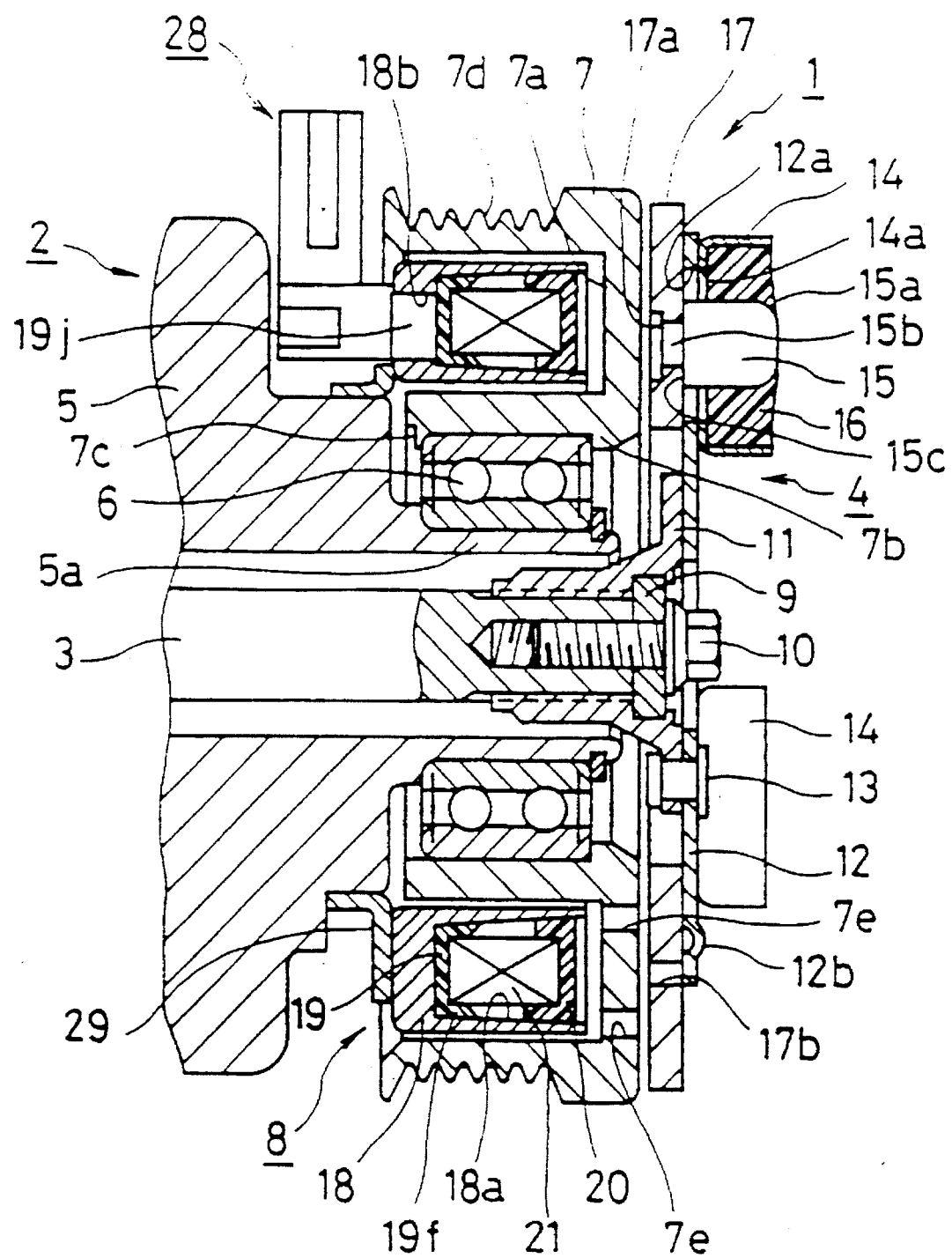
FIG. 1 is a sectional view of an electromagnetic clutch mounted on a vehicle air conditioner compressor.

The electromagnetic coupling device shown as an electromagnetic clutch 1 in FIG. 1 includes an armature assembly 4 mounted on a rotating shaft 3 of a vehicle air conditioner compressor 2, a rotor 7 journaled by a bearing 6 on a cylindrical section 5a formed in the housing 5 of a compressor 2, and an electromagnet 8 affixed to the housing 5 of the compressor 2. The armature assembly 4 is fitted to the rotatable shaft 3 of the compressor 2 of a vehicle air conditioner. The armature assembly 4 has an armature hub 11 that is retained on the rotating shaft 3 by a washer 9 and bolt 10. The washer 9 can be staked in an enlarged bore at the end of a splined bore in the hub 11 that receives the rotatable shaft 3. The washer 9 can also be an integral part of the hub 11 if a different spline forming procedure is employed. An armature holder plate 12 that is approximately triangular in shape when viewed from the front, is secured to the flange section of the armature hub 11 by rivets 13. The armature holder plate 12 has through-holes 12a in positions at the vertices of the triangle where they divide the perimeter into three equal sections. Ribs 12b with an arc shape are formed in the holder plate 12 to increase the rigidity of armature holder plate 12 on the three side portions between these through-holes 12a.

Cap-shaped damper covers 14, with through-holes 14a, that are nearly the same size as the through-holes 12a of the armature holder plate 12, are fused to armature holder plate 12 so that their centers will match the center of each through-hole 12a. A rubber damper 16, molded with a torque transmission pin 15 in its center is pressure adhered to each damper cover 14. The pin 15 has a head section 15a with a smooth arc shape. The end of each torque transmission pin 15 opposite the head section 15a passes through through-hole 12a of armature holder plate 12, and the small diameter, forward end cylindrical section 15b is inserted into stepped edge hole 17a of armature 17 and is staked inside the stepped edge hole 17a of armature 17. A stepped end 15c of each torque transmission pin 15 contacts the armature 17. Movement of the armature 17 toward the rubber damper 16 is restricted by the armature holder plate 12 and the center portion of rubber damper 16 will be elastically deformed toward the armature 17. An initial spring load is established on each rubber damper 16 to elastically urge the armature 17 toward the armature holder plate 12.

Arc-shaped slits 17b are formed in the armature 17 by a punch press or other suitable forming machine. The arc-shaped slits 17b, which pass through the armature at intervals around the perimeter of the armature, divert the magnetic flux. A friction surface on the armature 17 faces a friction surfaces on the rotor 7. A specific air gap is provided between the friction surface on the armature and the friction surface on the rotor 7 when the electromagnetic clutch 1 is disengaged. The rotor 7 is an annular member with an annular groove 7a. An annular section 7b of the rotor 7 projects radially inward. The outer race of a bearing 6 contacts the annular section 7b and is retained within the rotor 7 by piece 7c which is formed by staking.

A poly V-groove 7d is formed on the radially outer surface of the rotor 7. A poly V-belt is trained around an internal combustion engine drive pulley and the rotor 7, engages the poly V-grooves 7d and rotates the rotor. Arc shaped slits 7e for diverting the magnetic flux are formed in the friction surface of the rotor 7 by a punch press.

A yoke 18 of the electromagnet 8 is supported in an annular groove 7a of the rotor 7 by a mounting ring 29. The mounting ring 29 is secured to the yoke 18 and attached to the housing 5 of the compressor 2. The open side of yoke 18 faces the base of the annular groove 7a in the rotor 7. The annular groove 18a in the yoke 18 has tapered inner and outer walls. A nearly rectangular through-hole 18b is provided through the base of the annular groove 18a. A magnetizing coil 21, which is completely insulated from the outside by a coil bobbin 19 and a coil cover 20, is installed inside the annular groove 18a in the yoke 18.

The coil bobbin 19, as shown in FIGS. 5 to 8, has an annular groove 19a, which opens in the same direction as the annular groove 18a in the yoke 18. The forward end annular inner press-in piece 19c of the coil bobbin 19 has an inner wall section 19b, shown in FIG. 6, whose radius is smaller than the size of inner circumferential wall surface of the annular groove 18a of the yoke 18. The forward end annular outer press-in piece 19e of the coil bobbin 19 has an outer wall section 19d, shown in FIG. 6 whose radius is greater than the size of outer circumferential wall surface of the annular groove 18a of the yoke 18. The enclosing section 19f for a magnetizing coil 21 is formed by the inner and outer wall sections 19b and 19d that delineate the annular groove 19a.

Figure 5:
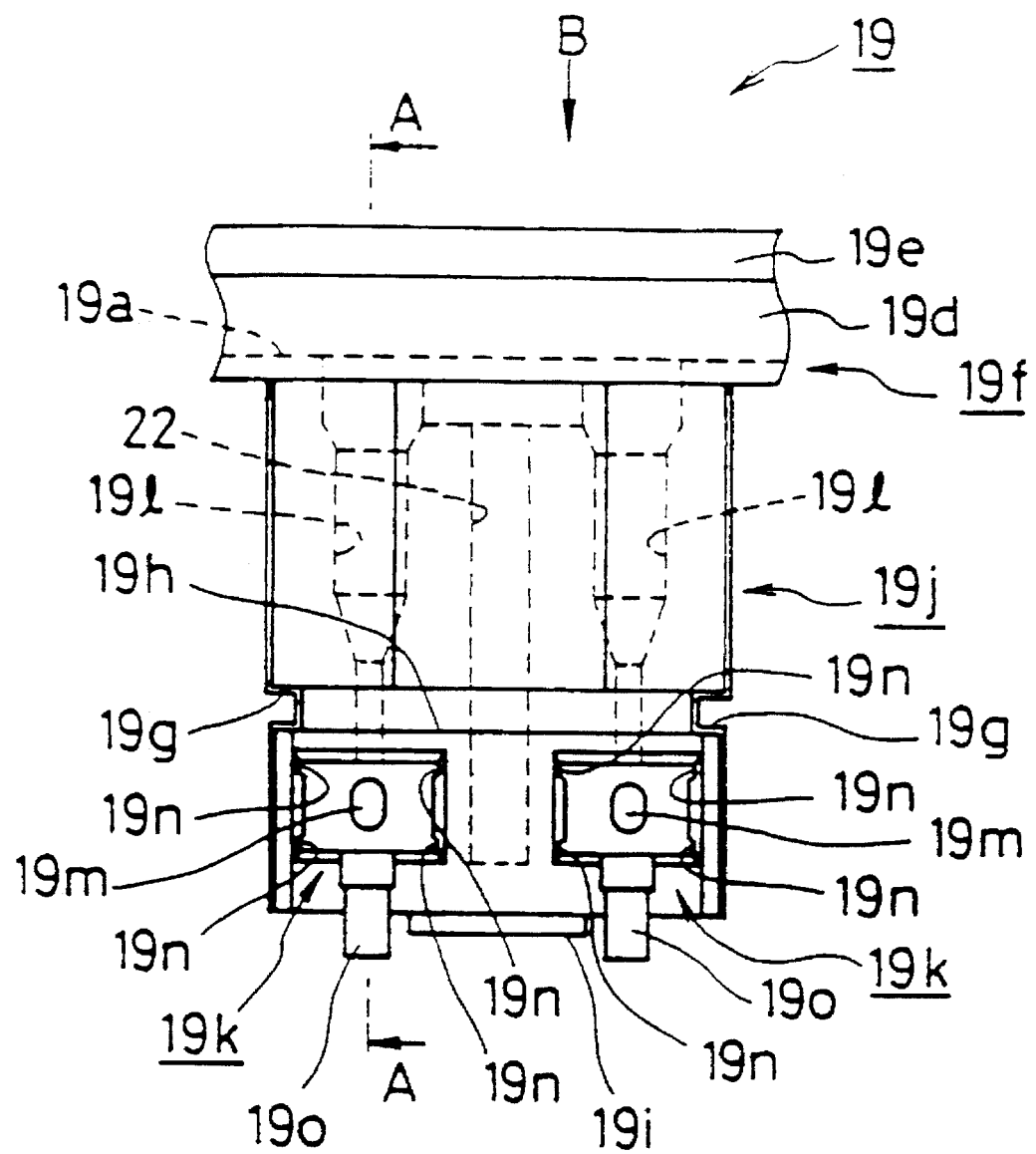
FIG. 5 is a top view of the terminal holder section of the coil bobbin with portions of the bobbin broken away.
Figure 6:
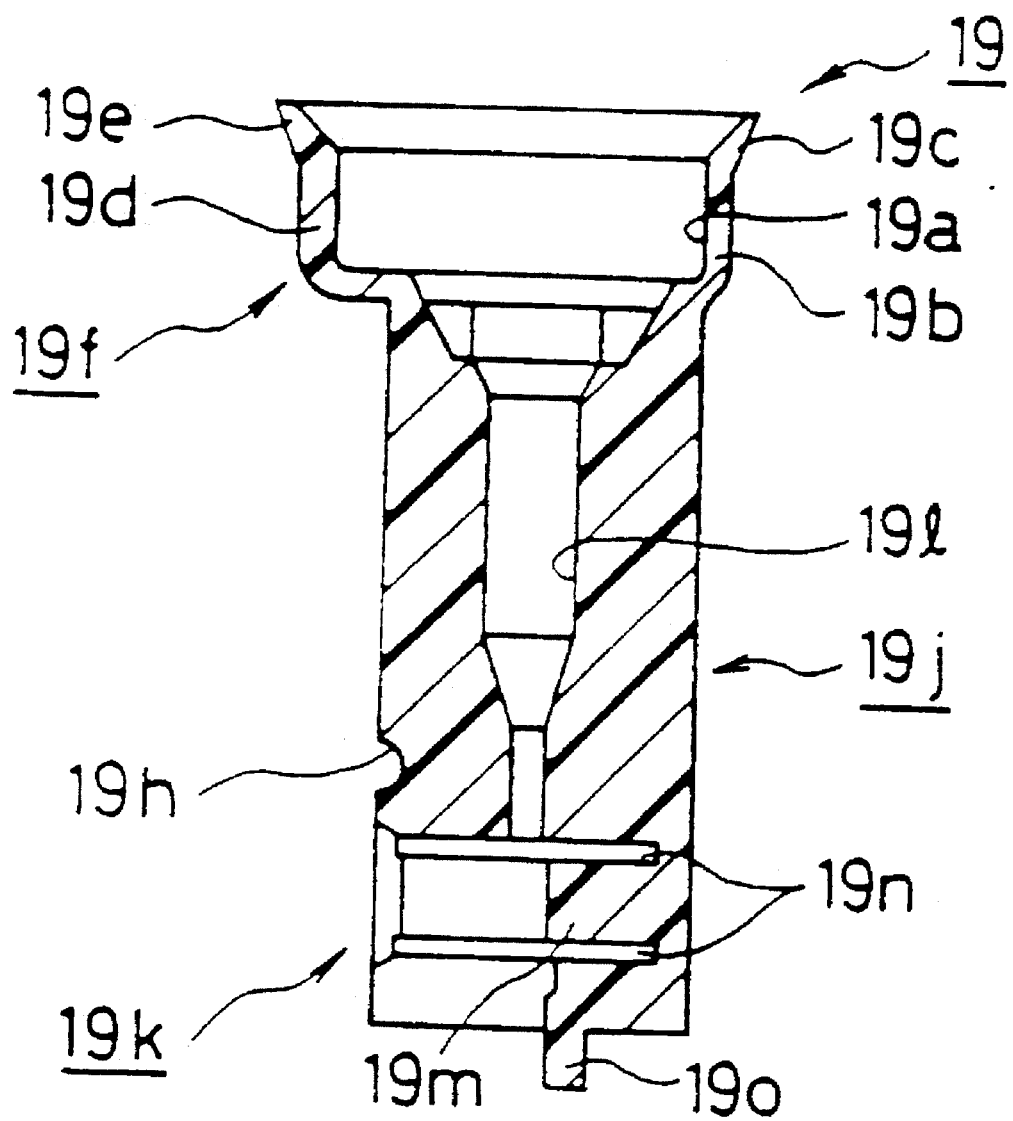
FIG. 6 is a sectional view taken along line A—A of FIG. 5.
Figure 7:
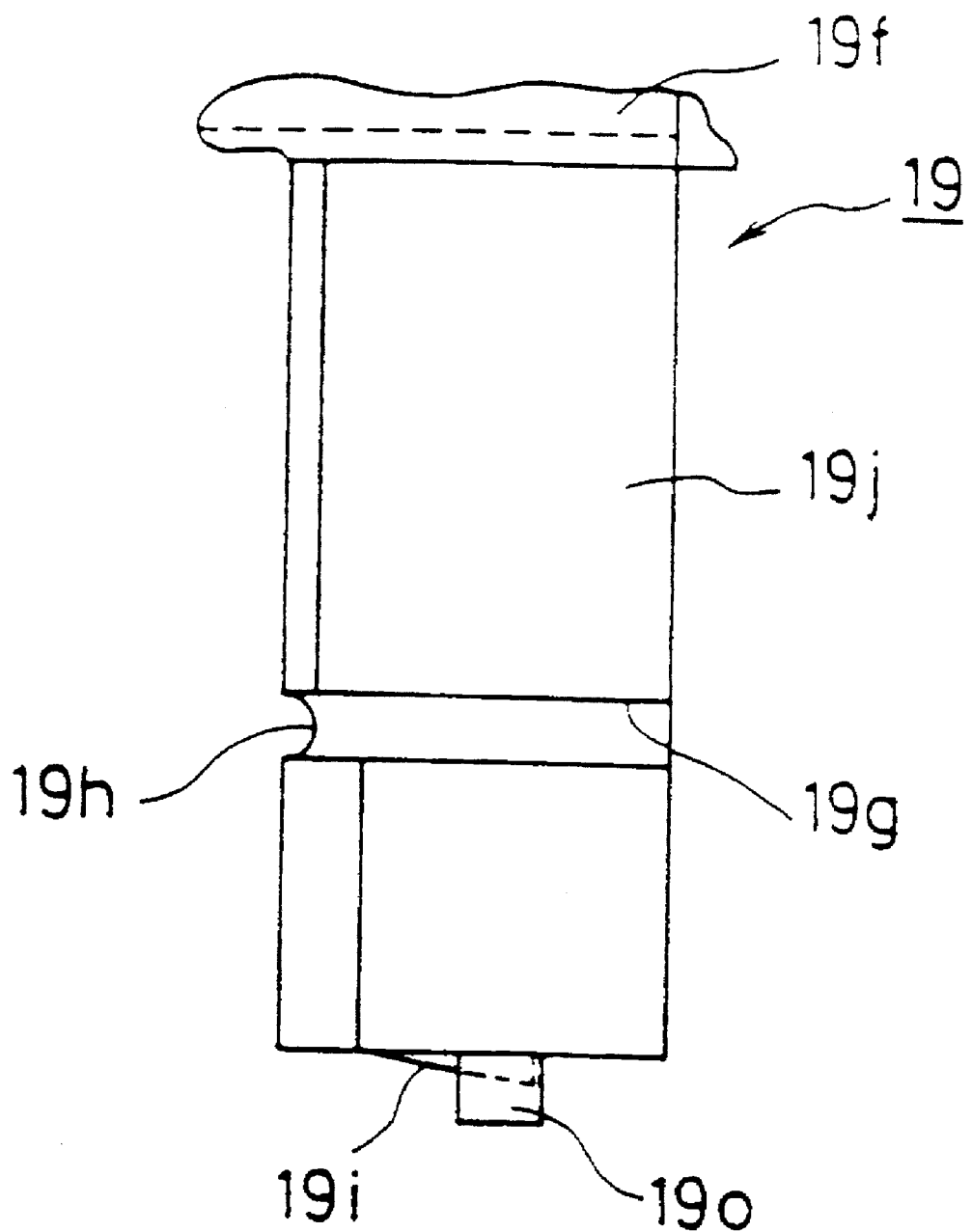
FIG. 7 is a right side view of the terminal holder section of FIG. 5.
Figure 8:
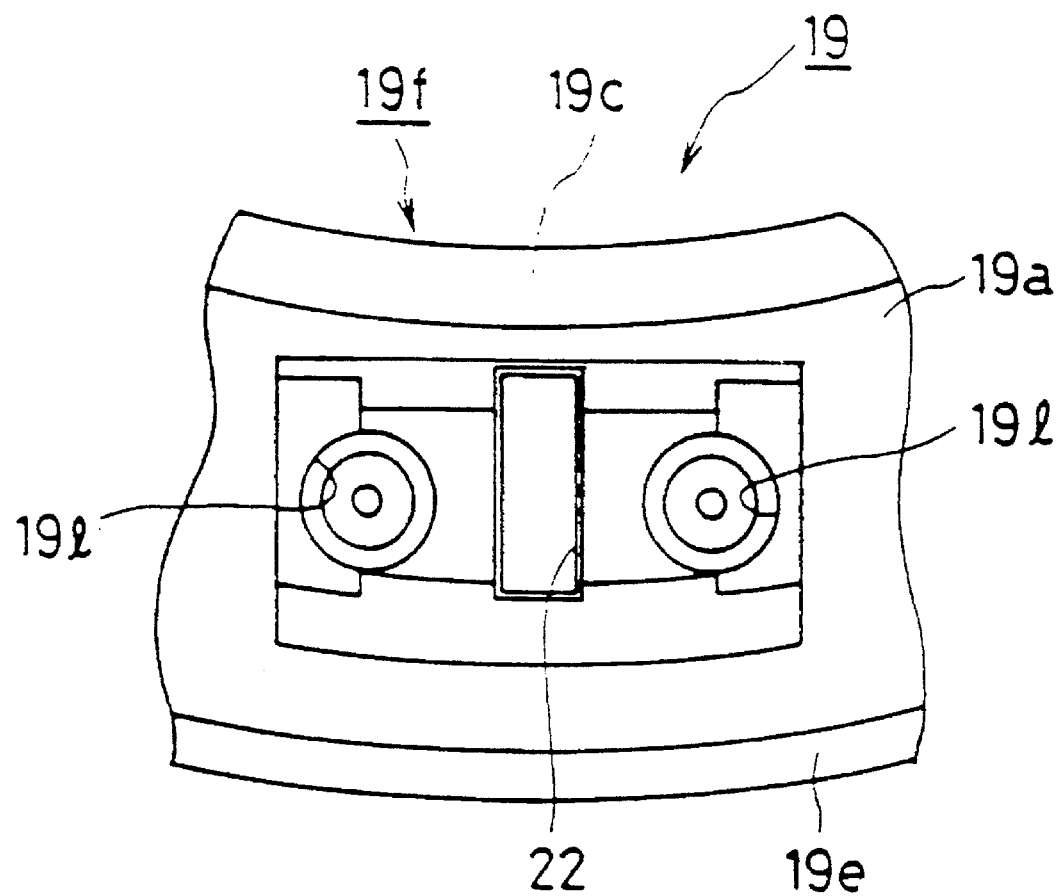
FIG. 8 is a front view of the terminal holder section taken in the direction of arrow B in FIG. 5.
Figure 9:
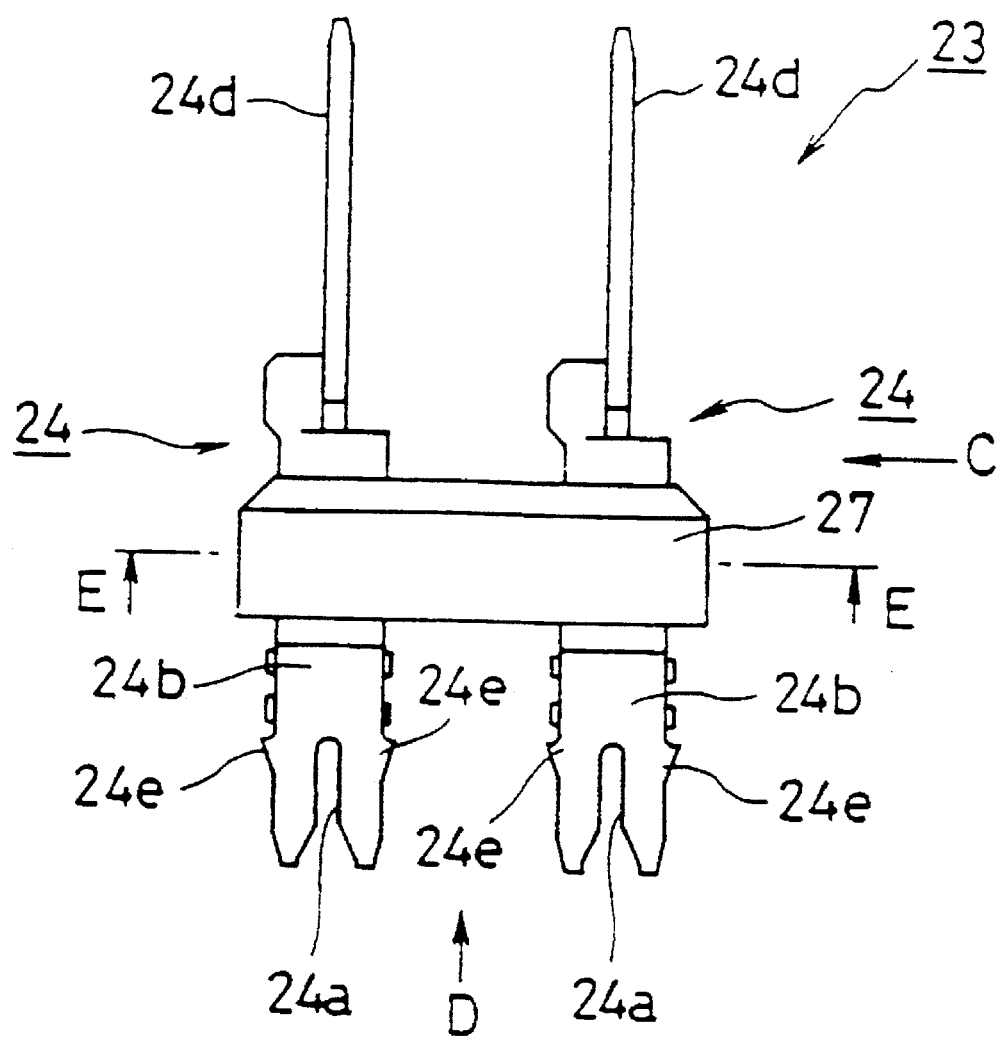
FIG. 9 is a front view of the terminal assembly.
Figure 10:
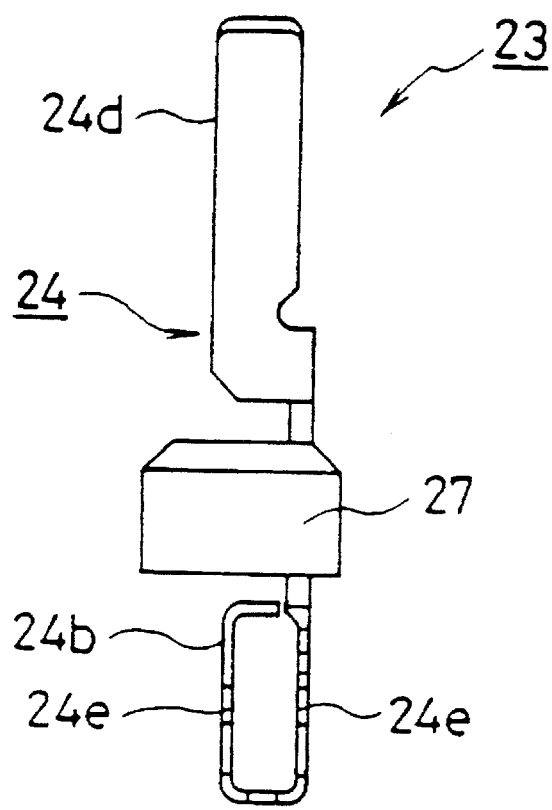
FIG. 10 is a side view taken in the direction of arrow C in FIG. 9.
Figure 11:
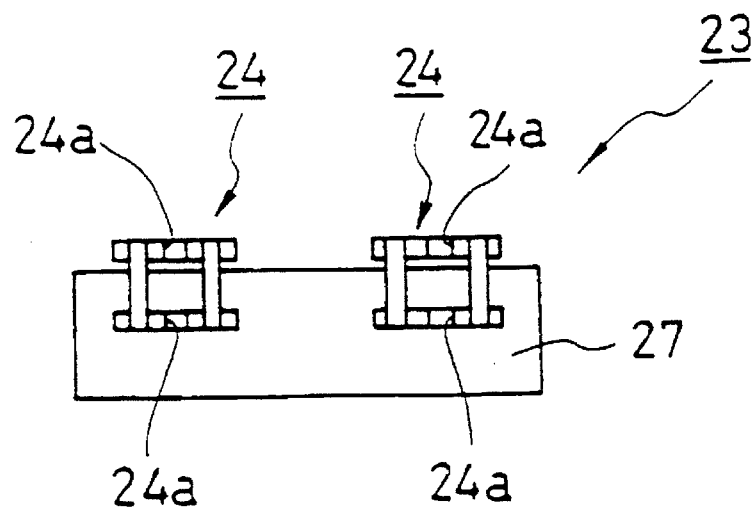
FIG. 11 is a bottom view taken in the direction of arrow D in FIG. 9.
Figure 12:
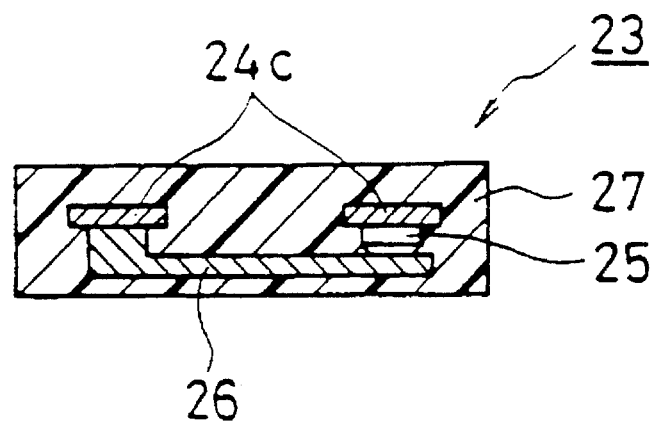
FIG. 12 is a sectional view taken along line E—E in FIG. 9.

A terminal holder section 19j is formed integral with the coil bobbin 19. A pair of guide grooves 19g as shown in FIG. 5 are formed in the terminal holder section 19j. The guide grooves 19g receive the fastening section 28e of terminal housing 28, discussed below.

A position alignment groove 19h and fastening projections 19i are formed integral with coil bobbin 19. The groove 19h and the fastening projection 19i are for securing the terminal housing 28 to the terminal holder section 19j. One end of the terminal holder section 19j communicates with the annular groove 19a of enclosing section 19f, and the other end communicates with the open section 19k discussed below. A pair of parallel holes 19l are provided in the terminal holder section 19j. The starting end of the wound section and the final end of the wound section of the magnetizing coil 21 are each inserted into one of the holes 19l. Wire support posts 19m are formed in open section 19k of coil bobbin 19. The wire support posts 19m are each encircled by the guide groove 19n into which the connecting section 24a of a terminal 24 is inserted and are slightly below the through-holes 19l. A semicylindrical projection section 19o projects outward at the rear end of terminal holder section 19j in the open section 19k. The upper concave wire guide surface of each semicylindrical projection section 19o is in alignment with the lower surface of one of the through-holes 19l. Note that the projection section 19o is cut off with the tip of each end of the magnetizing coil 21 during the assembly process. Also a blind hole 22 is formed between through-holes 19l to reduce weight and material requirements.

A terminal assembly 23 is installed in the open section 19k of the coil bobbin 19. As shown in FIGS. 9 through 12, the terminal assembly 23 has a pair of spaced parallel terminals 24 and a bridge 26. The bridge 26 includes a diode chip 25 placed between the second connection section 24c of a second terminal 24 and a nearly L-shaped conductor member or bridge 26 connected to the diode chip 25 and a second connection section 24c of the first terminal 24. The diode chip 25 forms a voltage surge absorption element that protects the magnetizing coil 21 from surges. The diode chip 25, the conductor member 26 and the second connection section 24c of both terminals 24 is embedded in an enclosing non-conductor member 27 made from a resin material.

Figure 13:
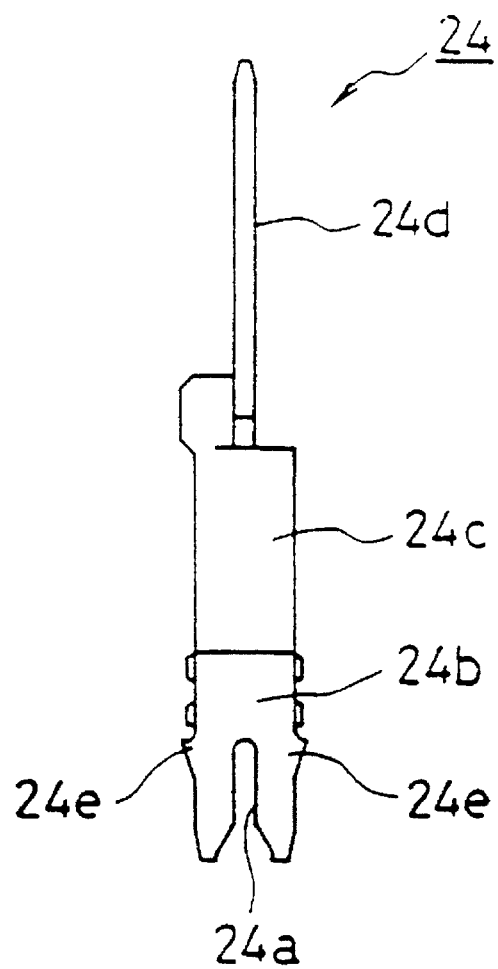
FIG. 13 is a front view of a terminal.
Figure 14:
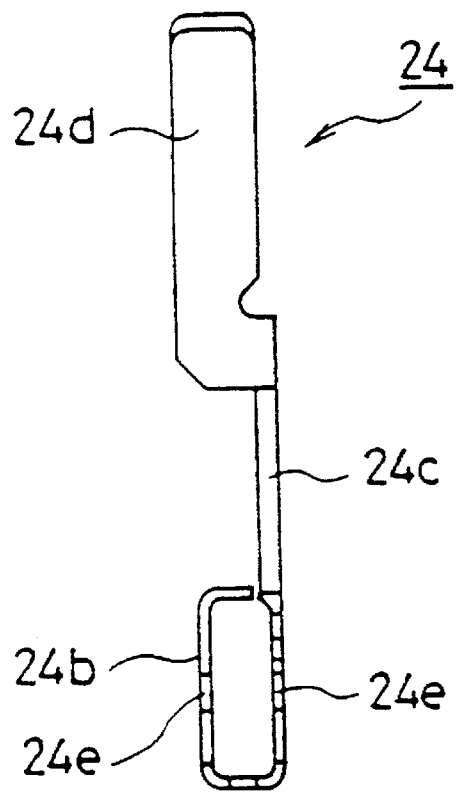
FIG. 14 is a side view of the terminal in FIG. 13.

Each terminal 24, as shown in FIGS. 13 and 14, has a first connection section 24b, which is bent to a nearly square shape and in which is formed a slit 24a, into which an end of the magnetizing coil 21 is pressed and connected with a sufficient area of electrical contact, a second connection section 24c, which is electrically connected to the diode chip 25 or bridge 26, and a third connection section 24d, which is connected to the outside power source connector. The projections 24e prevent the terminal from being pushed too far into or coming out of a guide groove 19n formed in open section 19k of the coil bobbin 19.

Figure 15:
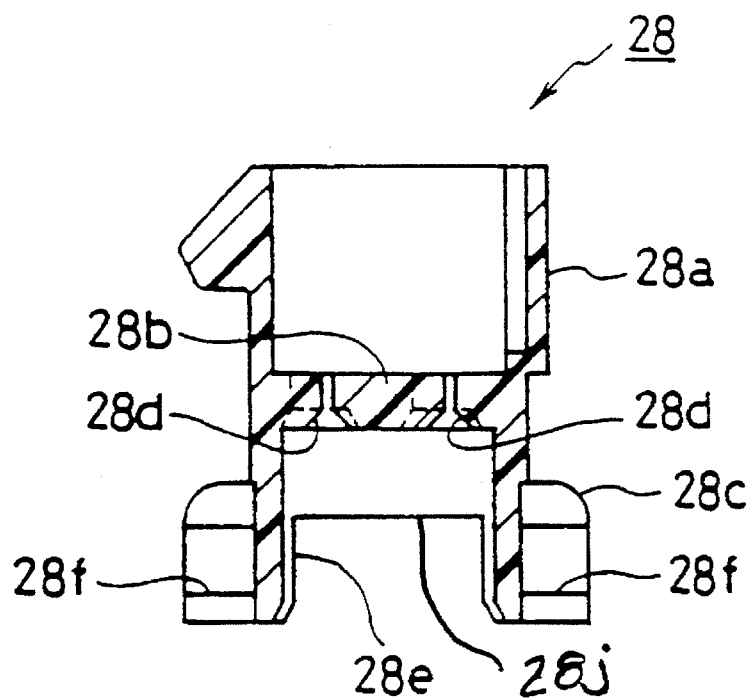
FIG. 15 is an enlarged section view of the terminal housing shown in FIG. 3.
Figure 16:
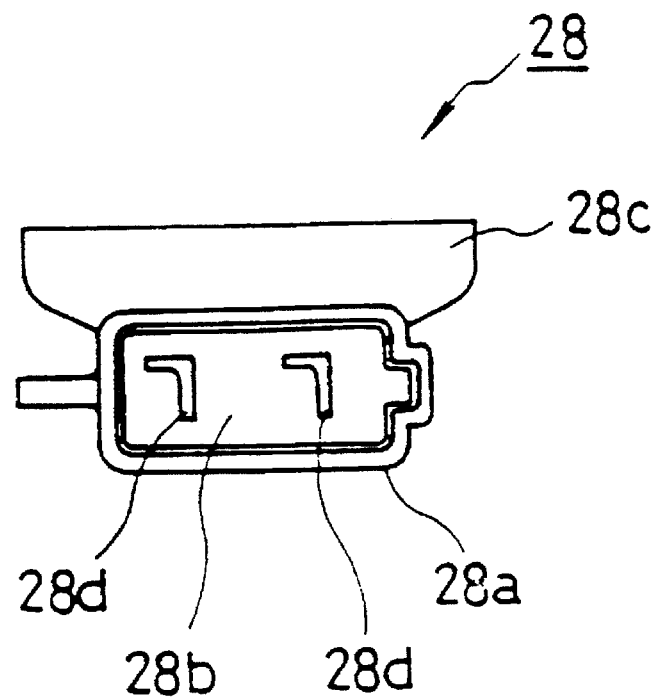
FIG. 16 is a top view of the terminal housing in FIG. 15.

The terminal assembly 23 is inserted into a terminal housing 28, shown in FIGS. 15 and 16. The terminal housing 28 has an upper housing section 28a that is an approximately square, columnar, open top closed bottom chamber. A lower housing section 28c includes the lower part of a middle wall 28b that serves as the bottom of the upper housing section 28a, has an approximate C-shape with the front side open, and that covers the terminal holder section 19j of coil bobbin 19. A pair of L-shaped slits 28d are provided through middle wall 28b. Projection sections 28e which fit into guide grooves 19g and surface 28j which fits into position alignment groove 19h formed in terminal holder section 19j of coil bobbin 19 are formed in lower housing section 28c. Furthermore, there is formed in lower housing section 28c a pair of depression section 28f into which a pair of cut pieces 29a formed in the mounting ring 29 fused to the back of yoke 8 are bent and fit.

Terminal assembly 23 is inserted through lower housing section 28c of the terminal housing 28. Each of the third connection sections 24d of the pair of terminals 24 of terminal assembly 23 is stuck into upper housing section 28a through each slit 28d in middle wall 28b. The enclosing member 27 is brought into contact with middle wall 28b to complete the assembly.

Figure 4:
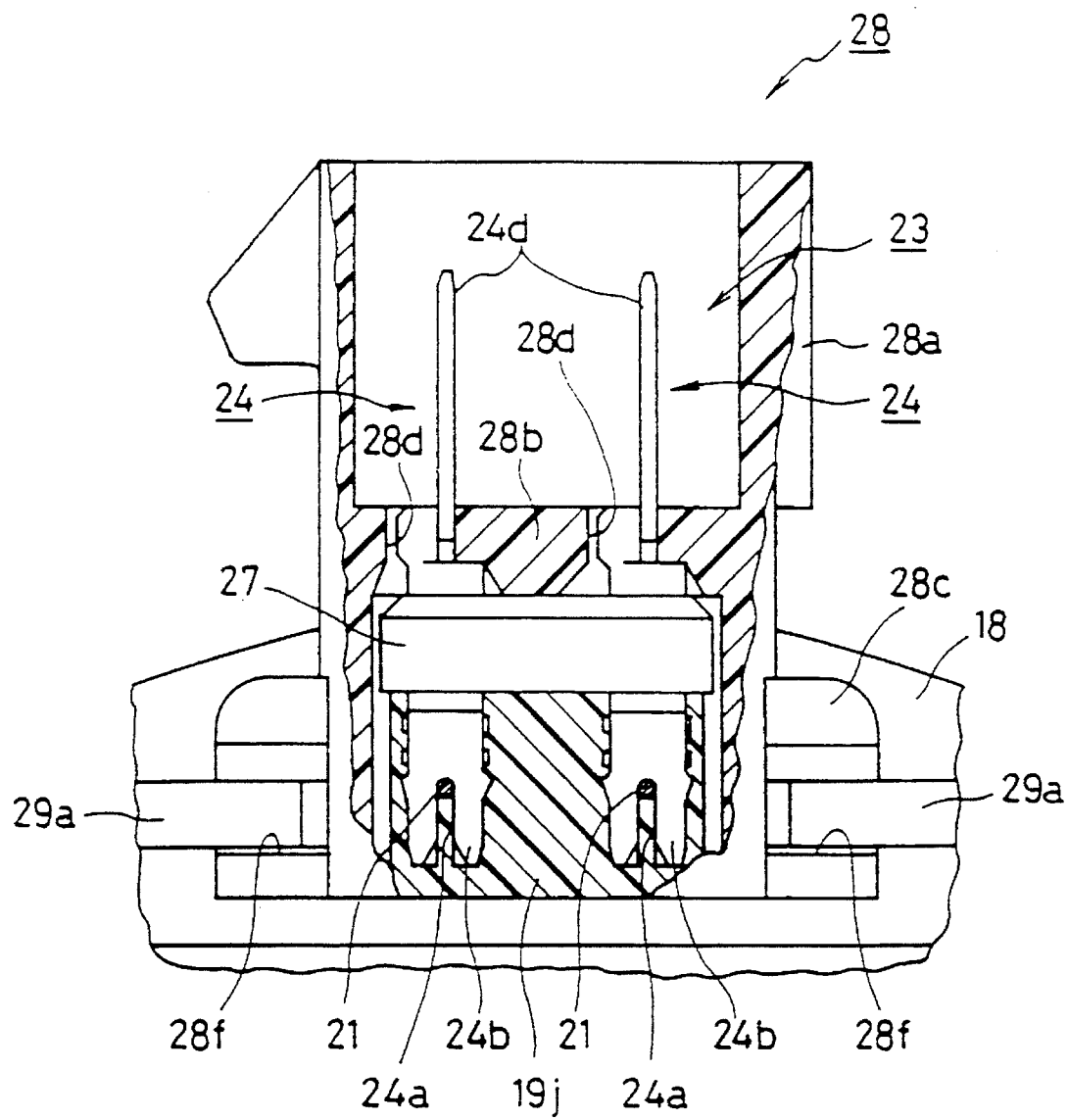
FIG. 4 is an enlarged rear elevational view of the terminal assembly and a portion of the bobbin of FIG. 3 with portions broken away.

Each of the first connection sections 24b of the pair of terminals 24 is pressed into open section 19k of coil bobbin 19. As the first connection sections 24b enter the guide groove 19n, each end lead of magnetizing coil 21 inserted through the pair of insertion holes 19l of coil bobbin 19 and supported on the wire support posts 19m and the projection section 19o will be guided into each slit 24a formed in the first connection section 24b of each terminal 24 and an electrical connection will be formed. The terminal holder section 19j of coil bobbin 19 is covered and received in the lower housing section 28c of terminal housing 28. The enclosing member 27 of terminal assembly 23 is held between middle wall 28b of terminal housing 28 and terminal holder section 19j of coil bobbin 19 as shown in FIG. 4.

Figure 2:
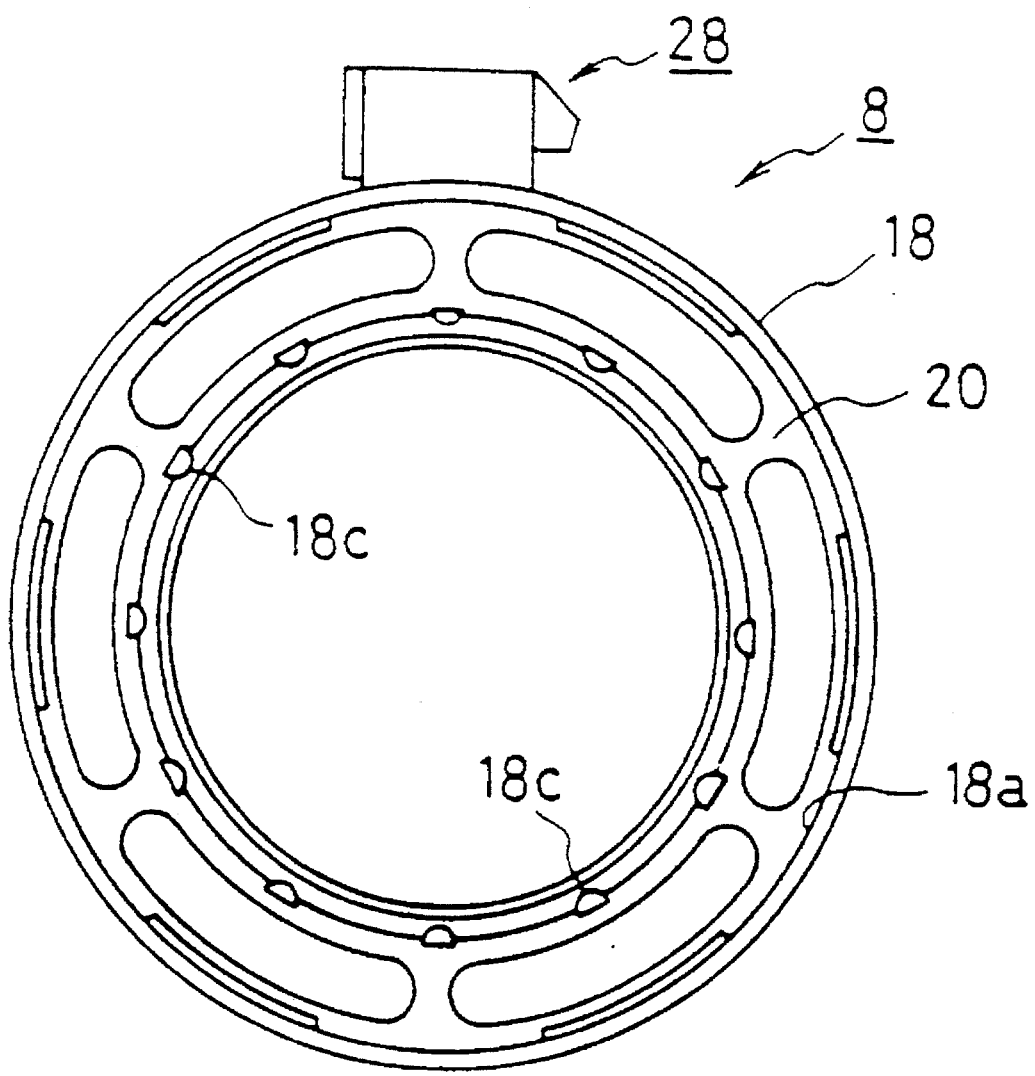
FIG. 2 is a front elevational view of the electromagnetic coil, bobbin and terminal assembly of FIG. 1.
Figure 3:
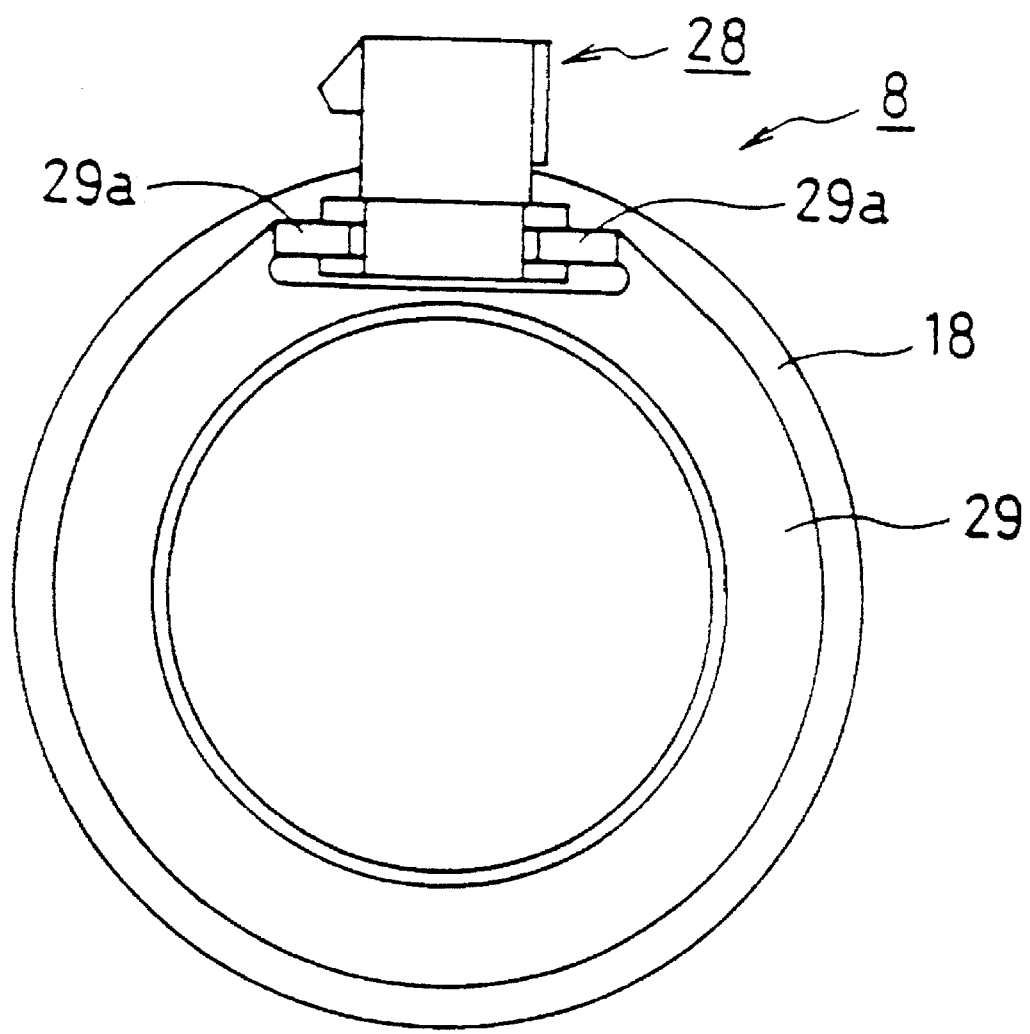
FIG. 3 is a rear elevational view of the electromagnetic coil, bobbin and terminal assembly of FIG. 1.

The magnetizing coil 21 is prevented from coming out of the yoke 18 by the coil cover that is staked in the yoke at 18c as shown in FIG. 2. The coil bobbin 19 is inserted into the yoke 18 with the terminal holder section 19*j* passing through the nearly rectangular through-hole 18*b* in the yoke 18. The coil cover 20 is placed over one end of the magnetizing coil 21. The coil cover 20, the magnetizing coil 21 and the coil bobbin 19 are pressed into the yoke 18 and held during staking at 18*c*. Pressing the coil cover 20 and the coil bobbin 19 into the yoke 18 squeezes the magnetizing coil 21 axially and radially thereby preventing movement between the magnetizing coil and the yoke. The coil cover 20 and the coil bobbin 19 are both made from a resin that completely insulate the magnetizing coil 21.

In an electromagnetic clutch 1, with the structure described above, when the armature 17 is magnetically attracted to the rotor 7, to which the engine's rotation is transmitted, by the magnetic attraction of magnetic flux generated by supplying current to the magnetizing coil 21, the rotation of the rotor 7 is transmitted to the rotatable shaft 3 and the compressor 2 is driven. When the magnetic flux is extinguished by cutting off current to the magnetizing coil 21, the armature 17 is separated from the rotor 7 by the damper rubber 16 which urges the armature 17 toward the armature holder plate 12. The compressor 2 stops following separation of the armature 17 from the rotor 7. Any voltage surges generated when the current flow to magnetizing coil 21 is started or stopped is absorbed by the diode chip 25.

Figure 17:
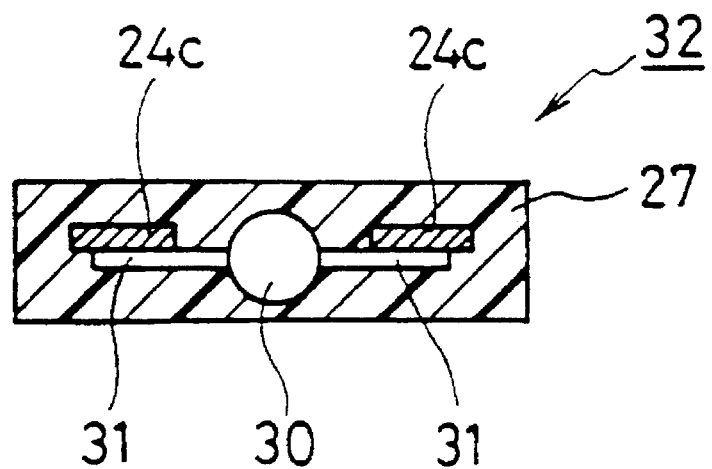
FIG. 17 is a sectional view of a terminal assembly with a modified construction corresponding to FIG. 12.
Figure 18:
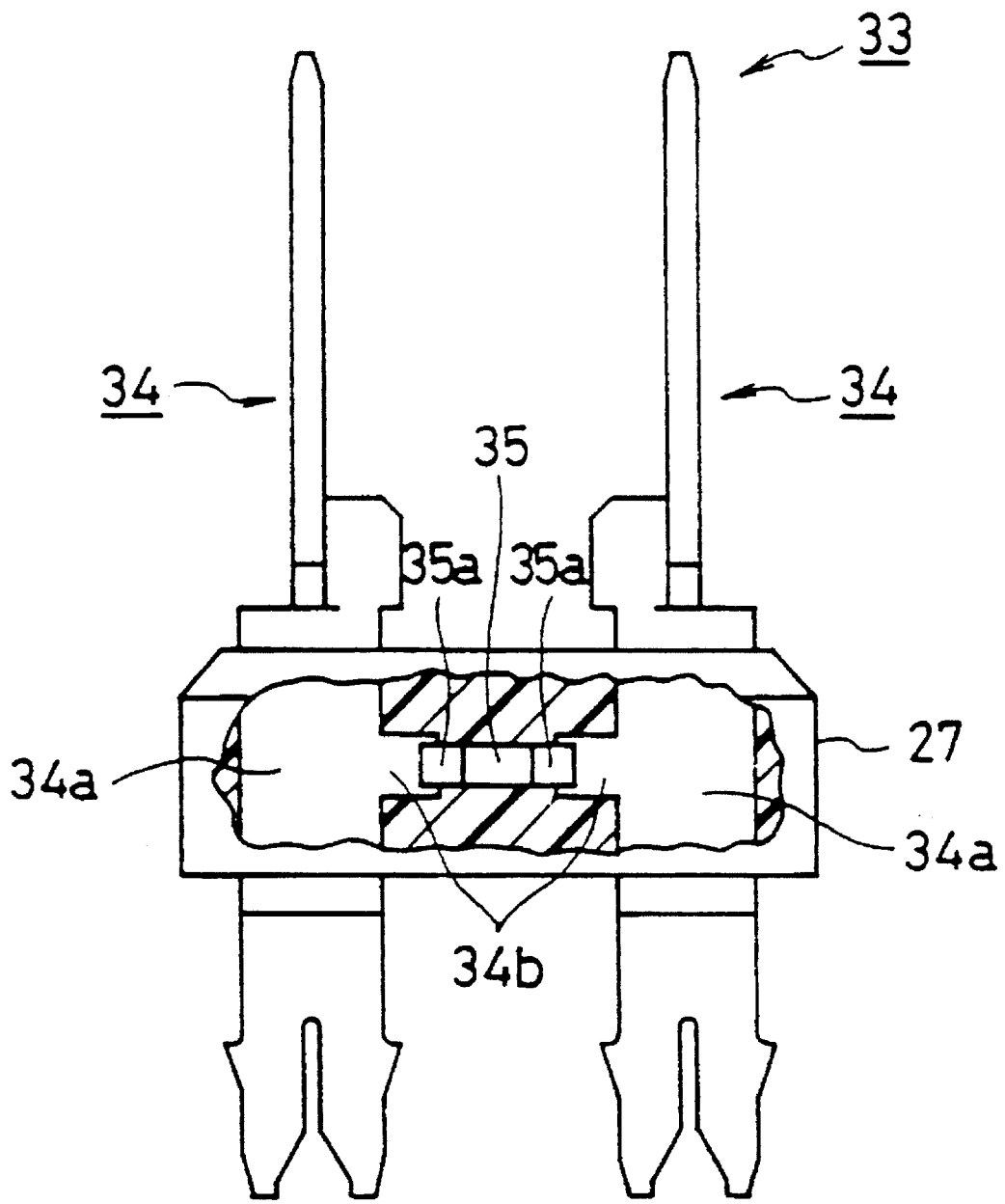
FIG. 18 is a front view with portions broken away of a terminal assembly having modified construction and corresponding to FIG. 9.

The diode chip 25 described above is embedded in the enclosing member 27 of the terminal assembly 23. The terminal assembly 32 shown in FIG. 17 has a lead wire type diode 30. Each of the lead wires 31 is connected to the second connection section 24*c* of one of the terminal 24 and is embedded in the enclosing member 27. A third terminal assembly 33 is shown in FIG. 18. The terminal assembly 33 includes a projection section 34*b* formed for a second connection section 34*a* on each of the two terminals 34. Metal pieces 35*a* of a diode 35 are soldered to the projection sections and are embedded in the enclosing member 27. A protective element other than a diode may be used as the voltage surge absorption element. An electromagnetic clutch 1 was described above as an application example, but the present invention can also be implemented for an electromagnetic brake in which an armature is magnetically attracted to an electromagnet.

The electromagnetic coupling device of the present invention, as explained in detailed above, has voltage surge absorption element 25 mounted between and connected to the second connection sections 24*c* of a pair of terminals 24. These second connection sections 24*c* and the voltage surge absorption element 25 are embedded in an enclosing member 27 and integrally secured. Each of the first connection sections 24*c* of the pair of terminals 24 is then pressed into a pair of open sections 19*k* formed in the terminal holder 19*j* of the coil bobbin 19. Each terminal 24 is thereby connected to one of the leads of the magnetizing coil 21. The process in which the starting end of the wound section and the final end of the wound section of the magnetizing coil 21 are each connected to one of a pair of terminals 24 and the process in which the magnetizing coil 24 and the voltage surge absorption element 25 are connected in parallel can be made simultaneous with the assembly process, and the manufacturability of the electromagnetic coupling device can be raised.

The enclosing member 27 is held and secured between the middle wall 28*b* of the terminal housing 28 and the terminal holder section 19*j* of the coil bobbin 19. Disconnection, due to external vibration, of the portions connecting the terminals 24 and the voltage surge absorption element 25, and the magnetizing coil 21 is prevented, and reliability and product quality is raised.

Although the description of this invention has been given with reference to a particular embodiments, it is not to be construed in a limiting sense. Many variations and modifications will now occur to those skilled in the art. For a definition of the invention reference is made to the appended claims.

What is claimed is:

1. An electromagnetic coupling device comprising an electromagnet that is equipped with a coil bobbin that has a magnetizing coil wound in multiple turns, a surrounding section in which is formed an annular groove into which this magnetizing coil fits, and a columnar terminal holder section with a pair of insertion holes into which the starting end of the wound section and the final end of the wound section of the aforementioned magnetizing coil are inserted; a yoke that has an annular groove that opens in the same direction as the annular groove of this coil bobbin and a through-hole through the bottom of this annular groove, and in which the enclosing section of the aforementioned coil bobbin is engaged in the aforementioned annular groove and in which the terminal holder section of the aforementioned coil bobbin is inserted through the aforementioned through-hole; a pair of open sections through the aforementioned terminal holder section of the aforementioned coil bobbin that is mounted on the back of the aforementioned yoke; a pair of terminals that have first connection sections that are connected to each end section of the aforementioned magnetizing coil inserted into the aforementioned insertion holes inside the aforementioned open sections; a voltage surge absorption element mounted between the second connection sections of these terminals; an enclosing member in which each of the second connection sections of the aforementioned pair of terminals and the aforementioned voltage surge absorption element are embedded and integrally secured; and a terminal housing with which the third connection sections of the aforementioned pair of terminals project externally, and, at the same time, with which the aforementioned enclosing member and the aforementioned coil bobbin terminal holder section are covered.

2. The electromagnetic coupling device of claim 1 further comprising a terminal housing that contains a middle wall in which is formed a pair of slits through which each of the third connection sections of the aforementioned pair of terminals pass, an upper housing that surrounds each of the third connection sections of the aforementioned pair of terminals, and a lower housing section in which the aforementioned enclosing member is housed and covers the aforementioned coil bobbin terminal holder section, and by the fact that the aforementioned enclosing member is affixed by being held between the aforementioned terminal housing middle wall and the aforementioned coil bobbin terminal holder section.

\* \* \* \* \*